(12) United States Patent
Sharma et al.

(10) Patent No.: US 7,089,379 B1
(45) Date of Patent: Aug. 8, 2006

(54) LARGE HIGH BANDWIDTH MEMORY SYSTEM

(75) Inventors: Navin Sharma, Worcester, MA (US); Jun Ohama, Mendon, MA (US); Douglas Sullivan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 406 days.

(21) Appl. No.: 10/185,898

(22) Filed: Jun. 28, 2002

(51) Int. Cl.
*G08F 12/00* (2006.01)

(52) U.S. Cl. ............................ 711/154; 711/5; 711/119; 711/127; 711/157; 365/230.03; 365/230.04

(58) Field of Classification Search ................ 711/5, 711/119, 127, 154, 157; 365/230.03, 230.04
See application file for complete search history.

(56) References Cited

U.S. PATENT DOCUMENTS 6,125,421 A * 9/2000 Roy ............................. 711/5
6,260,127 B1 * 7/2001 Olarig et al. ................ 711/167
6,640,282 B1 * 10/2003 MacLaren et al. .......... 711/115

\* cited by examiner

*Primary Examiner*—Donald Sparks
*Assistant Examiner*—Bao Q Truong
(74) *Attorney, Agent, or Firm*—BainwoodHuang

(57) ABSTRACT

A memory system is divided into memory subsystems. Each subsystem includes a slave controller. Each slave controller is coupled to a serial link. A master controller is coupled to the slave controllers via the serial links, and the master controller is capable of initiating a memory access to a memory subsystem by communicating with the slave controller via the serial link. Each memory subsystem includes memory arrays coupled to the slave controller. Each memory array includes memory channels. Memory accesses to a memory array on a memory subsystem are interleaved by the slave controller between the memory channels, and memory accesses to a memory subsystem are striped by the slave controller between the memory arrays on the memory subsystem. Memory accesses are striped between memory subsystems by the master controller. The master controller and slave controllers communicate by sending link packets and protocol packets over the serial links.

18 Claims, 15 Drawing Sheets

| SYMBOL | NUMBER OF BITS | DESCRIPTION |
|---|---|---|
| CMD [3:0] | 4 | COMMAND: THIS FIELD DEFINES THE TYPE OF LINK PACKET AS FOLLOWS:<br>0000: IDLE PACKET<br>0100: INIT RESPONSE PACKET<br>1100: INIT REQUEST PACKET<br>ALL OTHER ENCODING IS RESERVED FOR PROTOCOL PACKETS. |
| PID [7:0] | 8 | PACKET ID: SEQUENTIAL NUMBER ASSIGNED TO EACH PACKET. USED FOR LINK-LEVEL RETRY AND DUPLICATE PACKET ELIMINATION. |
| CRD0 [3:0] | 4 | CREDIT FOR CHANNEL 0: THIS FIELD CONTAINS THE CREDIT BEING RETURNED TO THE MASTER CONTROLLER 26 FOR CHANNEL 0 (TAG REQUEST CHANNEL). THE SLAVE CONTROLLER 40 GENERATES THIS FIELD. |
| CRD1 [3:0] | 4 | CREDIT FOR CHANNEL 1: THIS FIELD CONTAINS THE CREDIT BEING RETURNED TO THE MASTER CONTROLLER 26 FOR CHANNEL 1 (DATA REQUEST CHANNEL). THE SLAVE CONTROLLER 40 GENERATES THIS FIELD. |
| LVPID [7:0] | 8 | LAST VALID PROTOCOL PACKET RECEIVED. THIS FIELD RETURNS THE LAST VALID PACKET NUMBER (PID) RECEIVED AT THE REMOTE NODE. THIS FIELD IS USED FOR RETRY. |
| STAT [3:0] | 4 | LINK STATUS: STATUS FROM THE REMOTE RECEIVER.<br>0000: NO ERROR<br>0100: OVERRUN/UNDERRUN ERROR AT REMOTE RECEIVER<br>0101: INVALID CHARACTER ERROR AT REMOTE RECEIVER<br>0110: DISPARITY ERROR AR REMOTE RECEIVER<br>0111: LOSS OF SYNCHRONIZATION AT REMOTE RECEIVER<br>1001: CORRECTABLE ERROR DUE TO SELF-SCRUBBING<br>1010: UN-CORRECTABLE ERROR DUE TO SELF-SCRUBBING<br>1100: CRC ERROR DETECTED<br>ALL OTHER ENCODING IS RESERVED. |
| CRC [31:0] | 32 | CRC: THIS FIELD CONTAINS CRC FOR THE ENTIRE PACKET. |

FIG. 11

| SYMBOL | NUMBER OF BITS | DESCRIPTION |
|---|---|---|
| CMD [3:0] | 4 | COMMAND: THIS FIELD IS DEFINED AS FOLLOWS:<br>0010: RESPONSE PACKET EXCEPT INIT RESPONSE<br>1000: MEMORY READ REQUEST<br>1001: MEMORY WRITE REQUEST<br>1010: EXTERNAL CSR READ REQUEST<br>1011: EXTERNAL CSR WRITE REQUEST |
| PID [7:0] | 8 | PACKET ID: SEQUENTIAL NUMBER ASSIGNED TO EACH PACKET. USED FOR LINK-LEVEL RETRY AND DUPLICATE PACKET ELIMINATION. |
| CRD0 [3:0] | 4 | CREDIT FOR CHANNEL 0: THIS FIELD IS PRESENT IN THE RESPONSE OR IDLE PACKETS FROM THE SLAVE CONTROLLER. IN INIT RESPONSE PACKET, THIS FIELD CONTAINS THE INITIAL CREDIT AVAILABLE AT THE SLAVE CONTROLLER. OTHERWISE, THIS FIELD CONTAINS THE CREDIT BEING RETURNED. |
| CRD1 [3:0] | 4 | CREDIT FOR CHANNEL 1: THIS FIELD IS PRESENT ONLY IN THE RESPONSE OR IDLE PACKETS FROM THE SLAVE CONTROLLER. IN INIT RESPONSE PACKET, THIS FIELD CONTAINS INITIAL CREDIT AVAILABLE AT THE SLAVE CONTROLLER. OTHERWISE, THIS FIELD CONTAINS THE CREDIT BEING RETURNED. |
| LVPID [7:0] | 8 | LAST VALID PACKET ID RECEIVED: THIS FIELD RETURNS THE LAST VALID PACKET NUMBER (PID) RECEIVED AT THE REMOTE NODE. THIS FIELD IS USED FOR RETRY. |
| CRC [31:0] | 32 | CRC (LINK LAYER): THIS FIELD CONTAINS CRC FOR THE ENTIRE REQUEST PACKET. THIS FIELD COVERS ONLY COMMAND PORTION OF THE RESPONSE PACKET. |
| DATA | 1 | DATA: SET WHEN THE PACKET CONTAINS DATA. |
| VC | 1 | VIRTUAL CHANNELS: INDICATE WHICH VIRTUAL CHANNELS THE PACKET BELONGS TO. |

FIG. 13A

| TID [5:0] | 6 | TRANSACTION ID: BOTH REQUESTS AND RESPONSES ARE TAGGED WITH TID TO MATCH RESPONSE WITH REQUEST. |
|---|---|---|
| ADDR [42:0] | 43 | MEMORY ADDRESS: REQUEST PACKETS CONTAIN MEMORY ADDRESS. |
| SIZ [11:0] | 12 | REQUEST DATA SIZE IN BYTE: SIZE OF THE DATA REQUESTED. MINIMUM IS 1. MAXIMUM IS 4 KB. ALL ZERO IN THIS FIELD DENOTES 4 KB. FOR EXAMPLE, 12'h000: 4 KB<br>12'h001: 1 BYTE<br>12'hfff: 4095 BYTES |
| STAT [3:0] | 4 | STATUS: RESPONSE STATUS FROM THE SLAVE CONTROLLER.<br>0000: SUCCESSFUL<br>0001: RETRY<br>1000: MASTER ABORT (NON-EXISTING ADDRESS)<br>1001: CORRECTABLE ERROR<br>1010: UN-CORRECTABLE ERROR<br>1011: NO CREDIT AVAILABLE<br>ALL OTHER ENCODING IS RESERVED. |
| CRC2 | 32 | CRC2 (LINK LAYER): COVERS DATA PORTION OF RESPONSE PACKET. |

FIG. 13B

LARGE HIGH BANDWIDTH MEMORY SYSTEM

FIELD OF THE INVENTION

The present invention relates generally to memory systems, and more particularly to techniques for efficiently implementing very large high bandwidth memory systems.

BACKGROUND OF THE INVENTION

Today's very high capacity and high performance storage systems can include hundreds of terabytes of storage. It is preferable for performance reasons to include cache memory systems within such storage systems in order to increase data transfer rates between the storage system and the host systems that access the storage system. Because the capacity of the storage system is so large, very large cache memory systems are preferably provided to maximize performance. However, providing a high bandwidth, scalable memory system containing thousands of individual memory devices presents a design challenge. The thousands of memory devices present very wide bus widths to which controllers must interface. Furthermore, the memory devices are so many that the boards on which they reside are large and physically distant from each other, which presents signal integrity issues at high speeds. It would be desirable to provide a high bandwidth, scalable memory system in which pin count and signal integrity issues are efficiently dealt with.

SUMMARY OF THE INVENTION

In accordance with the principles of the invention, a memory system is divided into a plurality of memory subsystems, each subsystem including a slave controller, each slave controller coupled to a serial link. A master controller is coupled to the slave controllers via the serial links, and the master controller is capable of initiating a memory access to a memory subsystem by communicating with the slave controller via the serial link coupled to the slave controller.

More specifically, each memory subsystem includes a plurality of memory arrays coupled to the slave controller. Each memory array includes a plurality of memory channels. Each memory channel includes memory coupled to a memory channel controller.

According to a further aspect of the invention, memory accesses to a memory array on a memory subsystem are interleaved by the slave controller between the memory channels, and memory accesses to a memory subsystem are striped by the slave controller between the memory arrays on the memory board. Furthermore, memory accesses are striped between memory subsystems by the master controller.

According to another aspect of the invention, the master controller and slave controllers communicate by sending link packets and protocol packets over the serial links. The link packets include idle packets which are sent by the master controller to the slave controllers over the serial links when no protocol packets are being sent over the serial links. Link packets also include init request packets which are sent by the master controller to the slave controllers before any memory transfers are performed. Link packets further include init response packets which are sent by the slave controllers to the master controller in response to the init request packets. Protocol packets comprise request packets which are sent by the master controller to the slave controllers in order to initiate a memory transfer, and response packets which are sent by the slave controllers to the master controller in order to execute a memory transfer. The request packets may include data to be written to memory, and the response packets may include data read from memory.

Link packets and protocol packets include a packet identifier field. Each time the master controller sends a link or protocol packet, the master controller sequentially increments the packet identifier field in the packet. Each time the slave controller sends a link or protocol packet, the slave controller sequentially increments the packet identifier field in the packet. Link packets and protocol packets also include a last valid packet identifier. The last valid packet identifier in a link packet or protocol packet sent by a slave controller to the master controller identifies the last packet identifier received by the slave controller from the master controller. The last valid packet identifier in a link packet or protocol packet sent by the master controller to a slave controller identifies the last packet identifier received by the master controller from the slave controller.

The link packets and protocol packets include a credit field. The credit field contains a credit value sent from a slave controller to the master controller, and indicates to the master controller whether packets may be sent from the master controller to the slave controller.

The protocol packets include a transaction identifier field. The master controller uses the transaction identifier field to align response packets with request packets.

The invention includes similar methods and program products. The various aspects of the invention can be combined to produce an efficient very large memory system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 11 is a table describing the link packet fields shown in FIG. 10.

FIG. 13 is a table describing the protocol packet fields shown in FIG. 12.

DETAILED DESCRIPTION OF EXEMPLARY EMBODIMENTS

Figure 1:
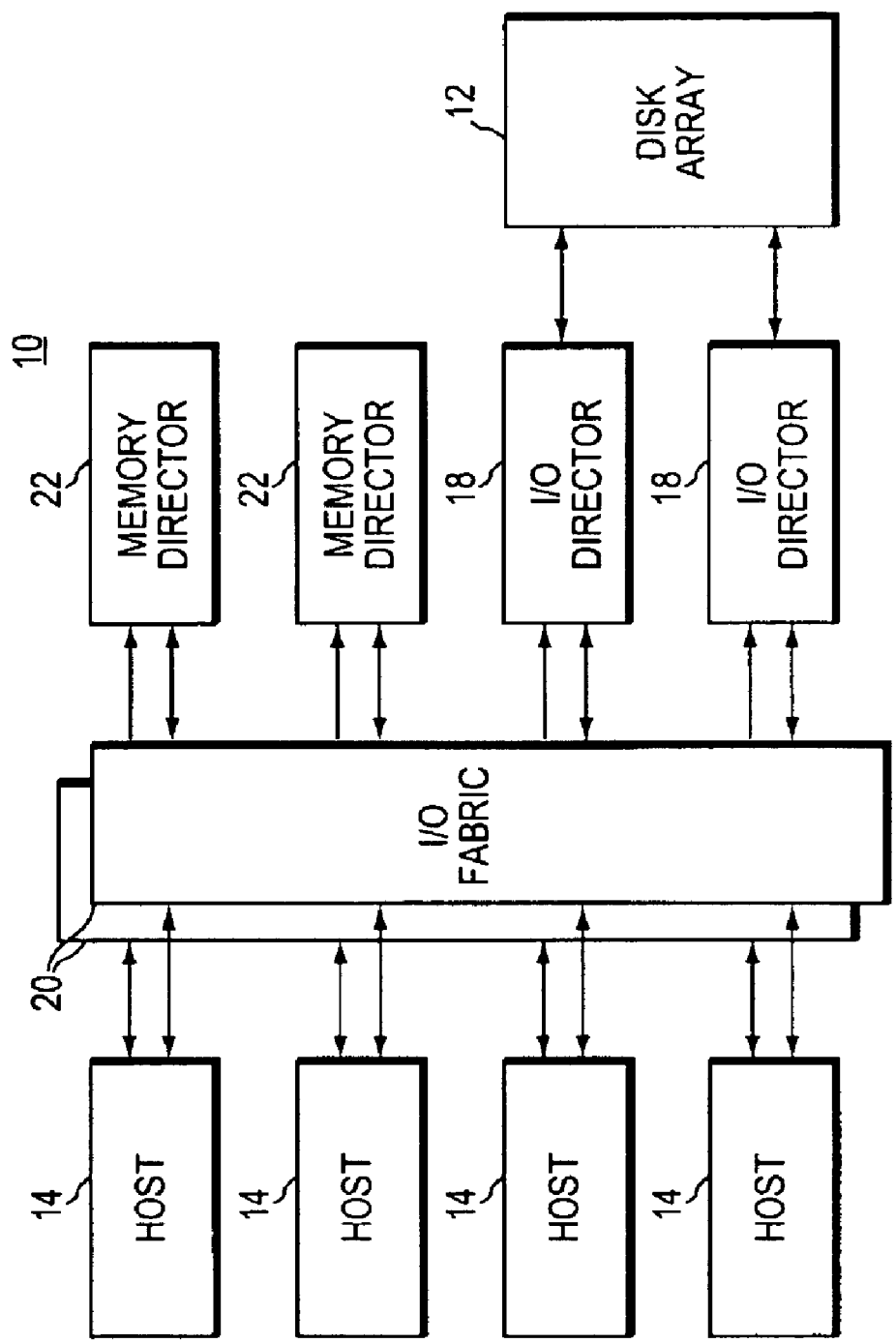
FIG. 1 is a schematic representation of a storage system including a memory director in accordance with the invention.

In FIG. 1 there is shown a storage system 10 providing a very large disk array 12 for storage of data by host systems 14 to which the storage system is connected. The disk array 12 may provide hundreds of terabytes of storage. In order to provide efficient access to such a large amount of storage, the storage system is partitioned as shown. The storage system 10 includes I/O directors 18, which are coupled via a pair of I/O fabrics 20. The I/O directors 18 control access to the disk array 12. In the implementation herein shown, up to 8 I/O directors are provided, though more could be included as capacity requires. The storage system 10 also includes memory directors 22. The implementation herein shown provides up to 16 memory directors 22, though more or fewer can be provided as capacity requires. The memory directors 22 provide a large disk block cache. The disk block cache is composed of large amounts of relatively fast dynamic memory. As blocks of data on the disk array 12 are accessed, the blocks are stored in the cache. The disk block cache substantially improves the performance of the storage system 10, as I/O requests from the hosts 14 can be satisfied much more quickly from the cache than from the disk array 12. The memory directors 22, I/O directors 18, and hosts 14 are all interconnected via the pair of I/O fabrics 20. The I/O fabrics 20 may be for example Infiniband™ switches.

Because the disk array 12 is so large, the disk block cache provided by the memory directors 22 is also very large. In accordance with a preferred embodiment, each memory director 22 provides up to 256 gigabytes (GB) of dynamic memory. A fully populated storage system including 16 memory directors thereby provides 4 terabytes (TB) of cache memory.

Figure 2:
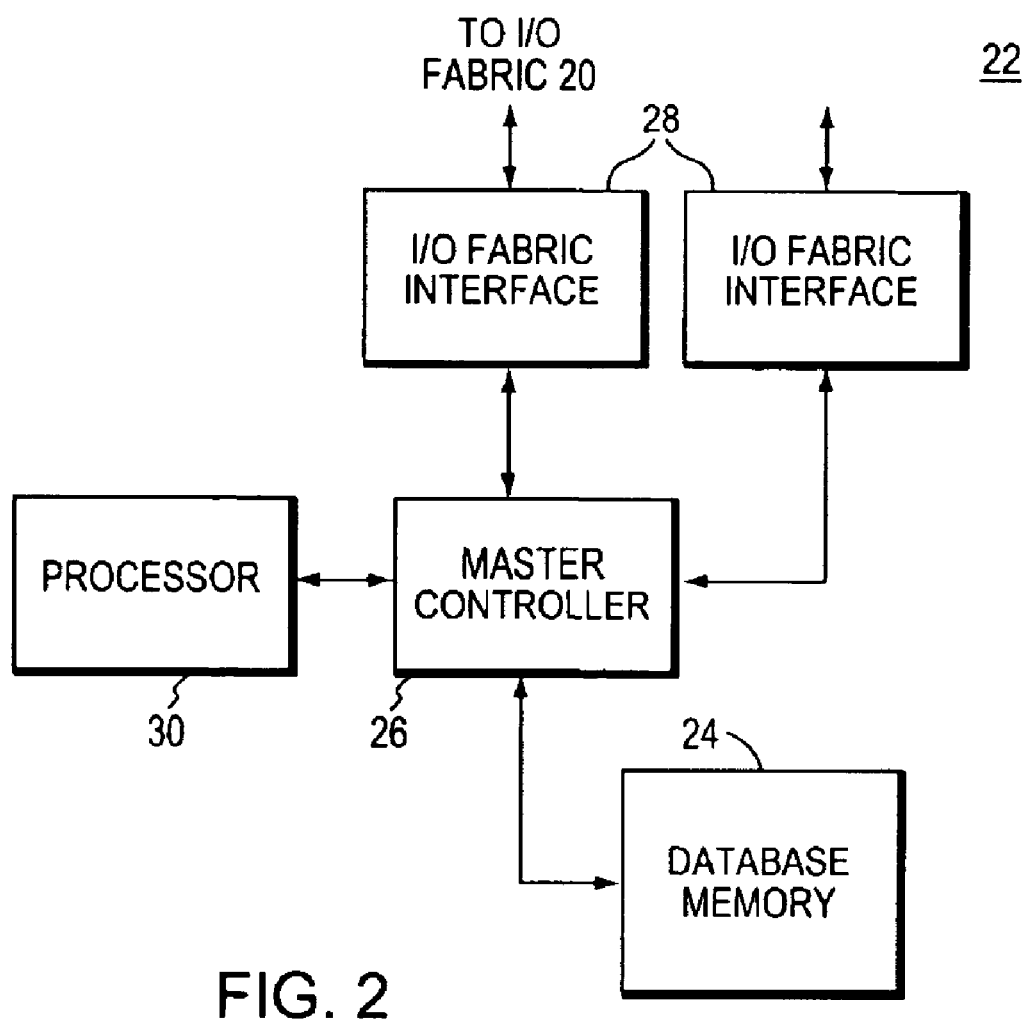
FIG. 2 is a schematic representation of the memory director shown in FIG. 1, including a master controller and database memory in accordance with the invention.

A memory director 22 is shown in further detail in FIG. 2. A database memory 24 of up to 256 GB is coupled to a master controller 26, preferably implemented as a memory director controller application specific integrated circuit (master controller) 26. The master controller 26 is further coupled to I/O fabric interfaces 28, for coupling with the I/O fabrics 20 of FIG. 1. The master controller 26 is also coupled to a local processor 30, which may function for example to control I/O fabric communication and cache tag management functions.

Figure 3:
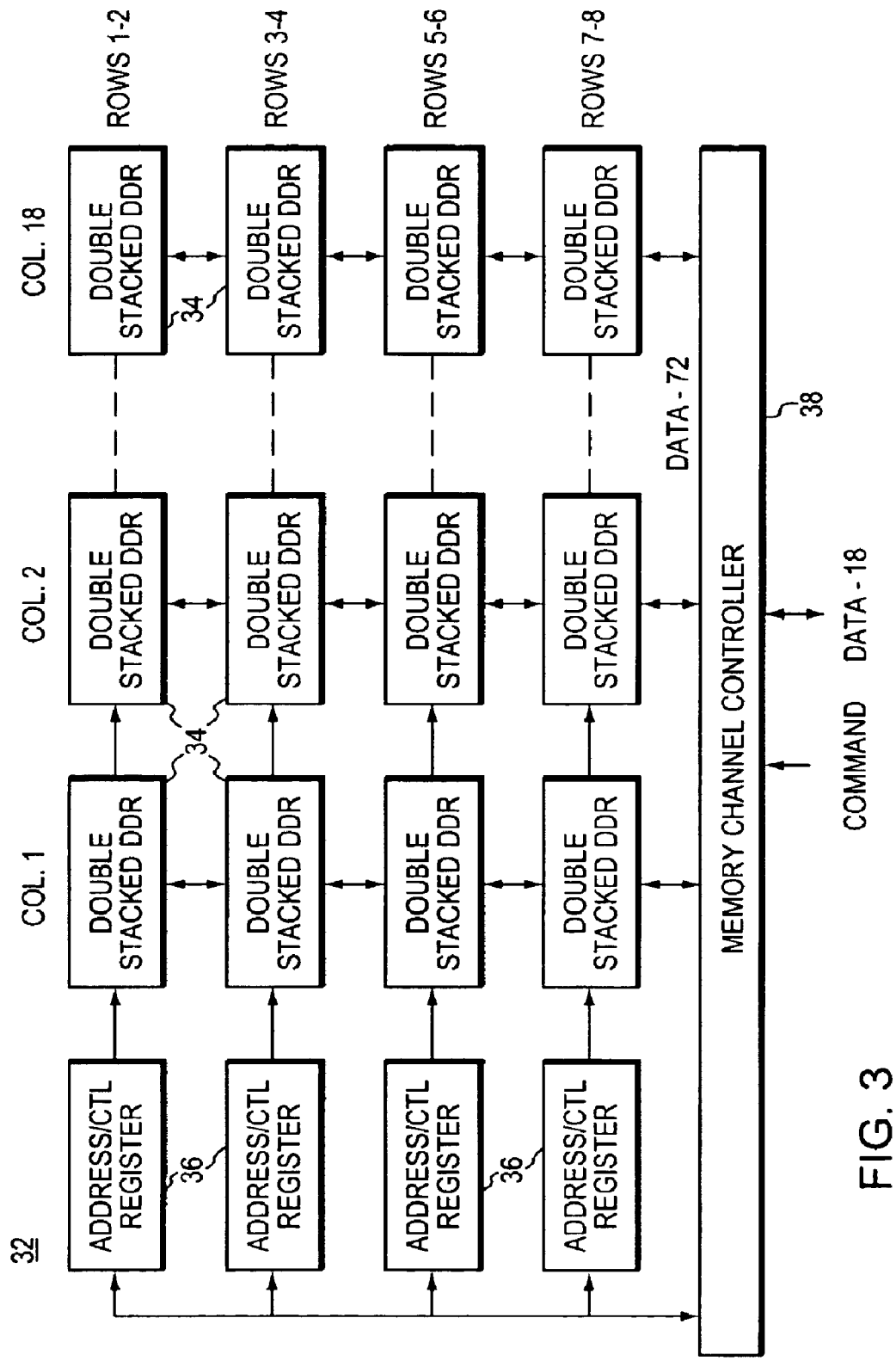
FIG. 3 is a schematic representation of a memory channel included within the database memory of FIG. 2.
Figure 4:
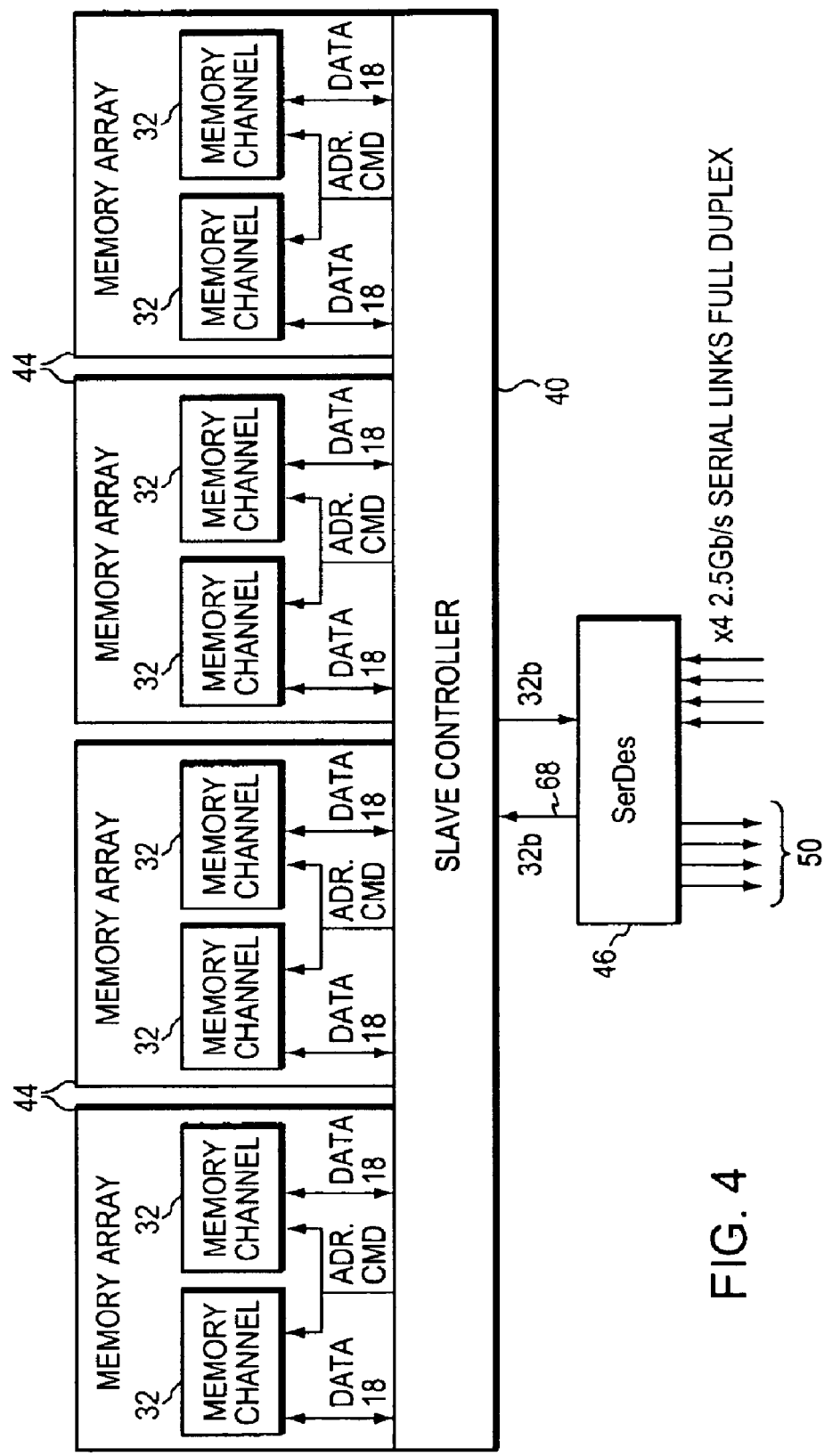
FIG. 4 is a schematic representation of a memory subsystem included within the database memory. The memory subsystem includes a slave controller in accordance with the invention.
Figure 5:
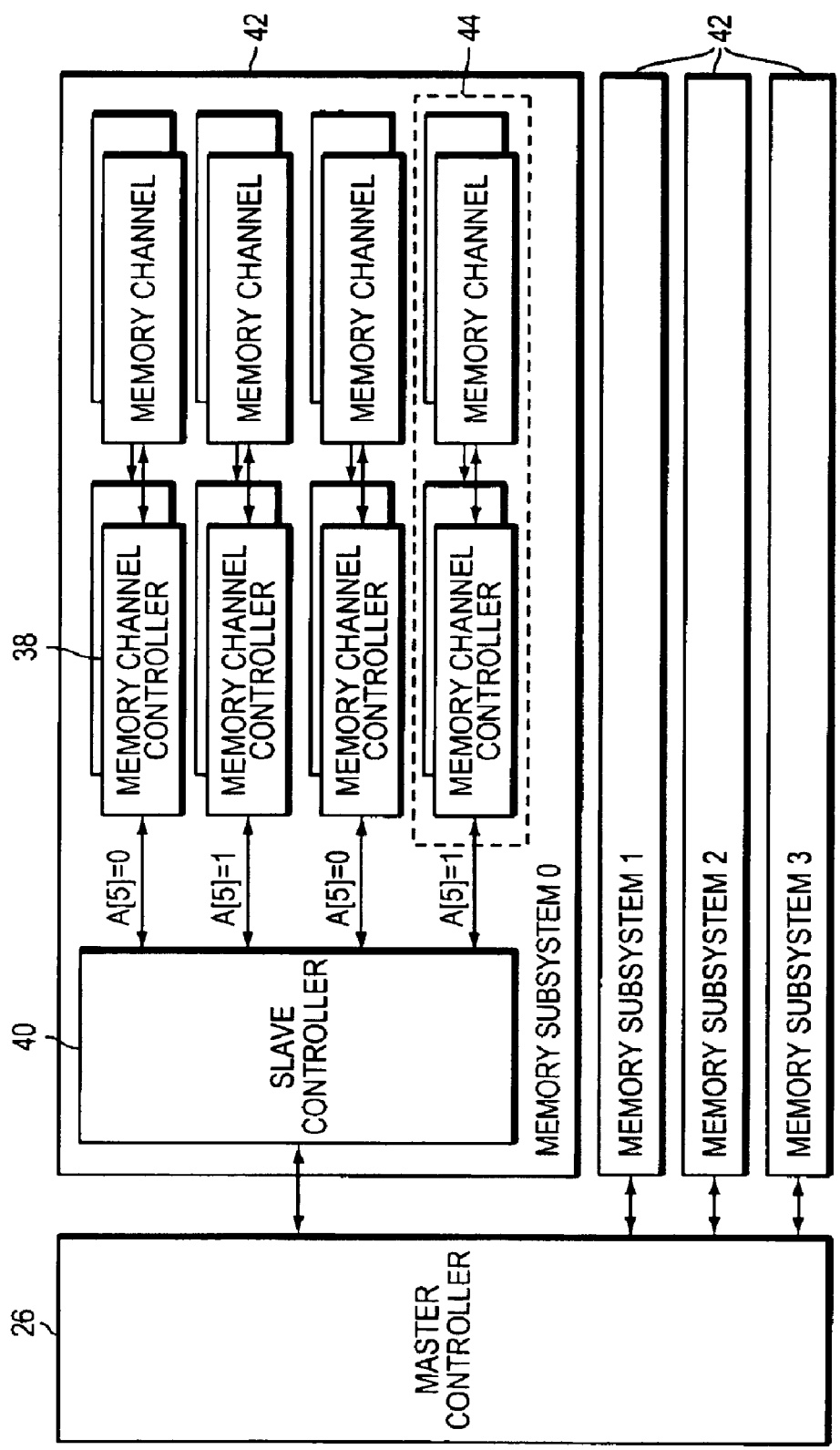
FIG. 5 is a schematic representation of the master controller coupled to the memory subsystems.

FIGS. 3–5 show how such a large database memory 24 is constructed. In FIG. 3 there is shown a memory channel 32. The memory channel 32 is the fundamental unit of memory that, combined with other such units, comprises the database memory 24. The memory channel 32 includes 72 double stacked double data rate dynamic random access (DDR) memories 34, or 144 physical memory devices, arranged in 8 rows by 18 columns, thereby providing 8 GB of memory in 16 byte addressable increments. Four address and control registers 36 provide address and control information for each physical row of double stacked DDR memory devices. The DDR memories 34 and address and control registers 36 are coupled to a memory channel controller 38, which may be for example a field programmable gate array (FPGA). The memory channel controller 38 operates the DDR memories at 100 Mhz, and provides the interface between the DDR memories and a 133 Mhz slave controller 40 (FIG. 4) to be further described. The minimum transfer size between the memory channel controller 38 and the DDR memory 34 is 32 bytes—that is, 2 beats of 16 bytes each. Each DDR channel operating at 100 Mhz is capable of a 1.6 GB/s physical transfer rate. However, in order to decrease the pin counts and bus rates feeding the slave controller 40, the memory channel controller 38 multiplexes the 72 bit double-data-rate data down to an 18 bit single data rate stream, reducing the data rate down to 266 MBs. The memory channel 32 is currently the industry standard maximum amount of memory that can be supported on one bus, largely driven by DRAM capacity and signal integrity issues. Memory channels 32 are further coupled together to form the large database memory 24 in accordance with the invention. It is understood that, as memory capacities increase and design improvements diminish signal integrity challenges, the size of the memory channel 32 can increase without departing from the principles of the invention and that even larger memory systems can then be provided.

Referring now to FIG. 4, there is shown one memory subsystem 42 in accordance with the principles of the invention. The memory channels 32 are arranged to provide 4 memory arrays 44. Each memory array 44 includes 2 of the memory channels 32 of FIG. 3. The slave controller 40 is coupled to the 4 memory arrays 44. For each memory array 44, the slave controller 40 provides one set of address and command signal lines to be shared between the 2 channels 32, and one set of 18 data lines for each of the channels 32. The two channels of each array are operated in lockstep —that is, they are accessed together as if they were a single channel. Thus, each of the four memory arrays 44 provides 144 data lines to the slave controller 40, which the slave controller operates on as 128 bits of data and 16 bits of ECC. In accordance with this arrangement, the failure of an entire DRAM can be tolerated without data loss. With each channel operating at 266 MB/s, each memory array provides 64 GB of data at 532 MB/s throughput. The slave controller is further coupled to a serializer/deserializer (SerDes) 46, to be further described.

Figure 6:
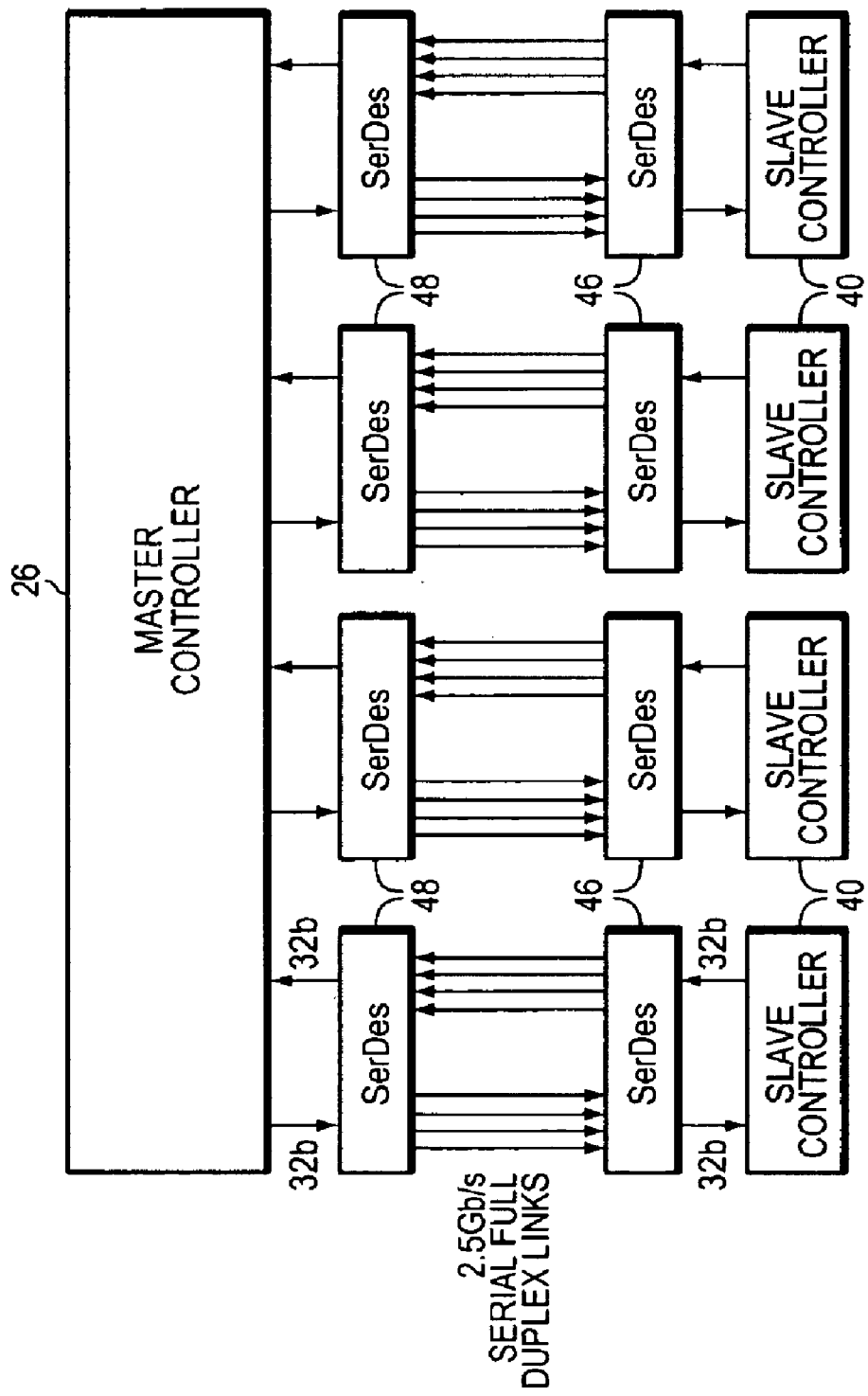
FIG. 6 is a schematic representation of the master controller coupled to the slave controllers via serial links.

Referring now to FIG. 5, the hierarchical memory system of the invention is shown. Four of the memory subsystems 42 of FIG. 4 are coupled to the master controller 26, providing the 256 GB database memory 24. Referring further to FIG. 6, the master controller 26 interfaces to each memory subsystem 42 via a SerDes 48. Each SerDes 48 is coupled to the corresponding SerDes 46 on the memory board 42. In accordance with the principles of the invention, the interface between the master controller 26 and each of the four slave controllers 40 is provided by a serial link 50. The serial links 50 of the preferred embodiment are each composed of 4 2.5 gigabit per second (Gb/s) full duplex differential pairs, thus providing high bandwidth of over 1 GBs. The serial bus interface between the master controller 26 and the slave controllers 40 is highly advantageous in that high bandwidth is achieved while PCB routes, connectors, and pin counts are minimized, and route distances are maximized. The memory subsystems 42 of the preferred embodiment each reside on a separate board, and are very large in that they contain over a thousand DRAM components. It is advantageous to couple such large boards 42 together via a chassis backplane, but this results in significant distances between the boards 42 and the master controller 26. The serial links 50 are capable of operating at high speeds over much greater distances than traditional parallel bus architectures that are known for use in memory designs, while also reducing the number of routes required across the backplane.

Figure 7:
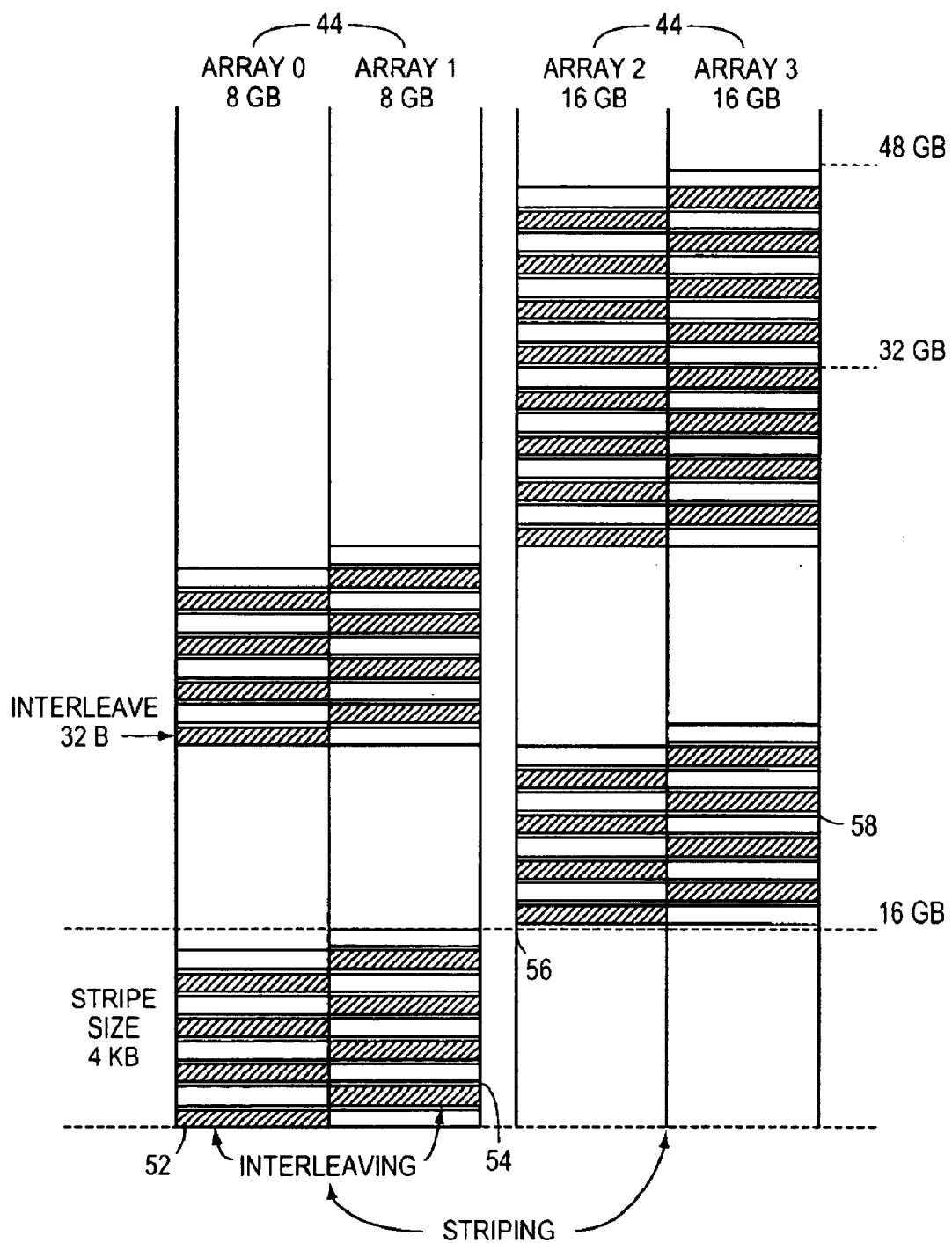
FIG. 7 is a depiction of how memory accesses are interleaved between memory channels, and further striped between memory arrays by the slave controller.

In accordance with the preferred embodiment, the master controller 26 is required to support 1 GB/s bandwidth to keep up with the I/O fabric rates (FIG. 2). The master controller 26 provides a 32 bit full duplex parallel double data rate connection (64 bits total) to the SerDes 48 at 133 Mhz. The double data rate connection provides 2 32 bit transfers per clock cycle in each direction, thus providing a little over 1 GB/s full duplex bandwidth to the SerDes 48. Likewise, the slave controller 40 on each memory subsystem 42 interfaces to the SerDes 46 via a similar 32 bit full duplex parallel double data rate connection at 133 Mhz, providing a little over 1 GB/s bandwidth at the slave controller 40. However, as previously described, each memory array 44 provides 532 MB/s bandwidth. Thus, in accordance with an aspect of the invention, the slave controller 40 interleaves each memory transaction between 2 memory arrays 44 in 32 byte granularity, thus utilizing the bandwidth of each memory array at the same time to provide the 1 GB/s throughput. The remaining 2 memory arrays 44 are accessed in a similar interleaved manner to provide 1 GB/s throughput in the other direction. 1 GB/s full duplex bandwidth is thereby provided. In accordance with a further aspect of the invention, memory transactions are striped across the two array 44 pairs at a programmable granularity that is preferably larger than the disk block size. Referring to FIG. 7, there is shown an example of the interleaving and striping. As seen here, each memory array 44 of an interleaved pair is the same size, but the memory array pairs may be different sizes. As shown, each array comprising the first memory array pair (Array 0 and Array 1) is 8 GB large. Each array comprising the second memory array pair (Array 2 and Array 3) is 16 GB large. As herein shown, the stripe size is 4 KB, and an 8 KB request is being processed. The first 4 KB of the request accesses Arrays 0 and 1. Address bit A5 (FIG. 5) is used to interleave the memory accesses, such that the first 32 bytes (16 bytes per beat for the DDR DRAM) (designated 52) are written to Array 0, the next 32 bytes (54) to Array 1, the third to Array 0, etc. At the 4 KB stripe boundary (56), the remainder of the request accesses Arrays 2 and 3 (58), with interleaving continuing. When Array 0 and 1 capacity is used up, accesses continue to Arrays 2 and 3 in an interleaved manner. One skilled in the art will realize that any stripe size that is advantageous to one's particular implementation may be chosen.

Figure 8:
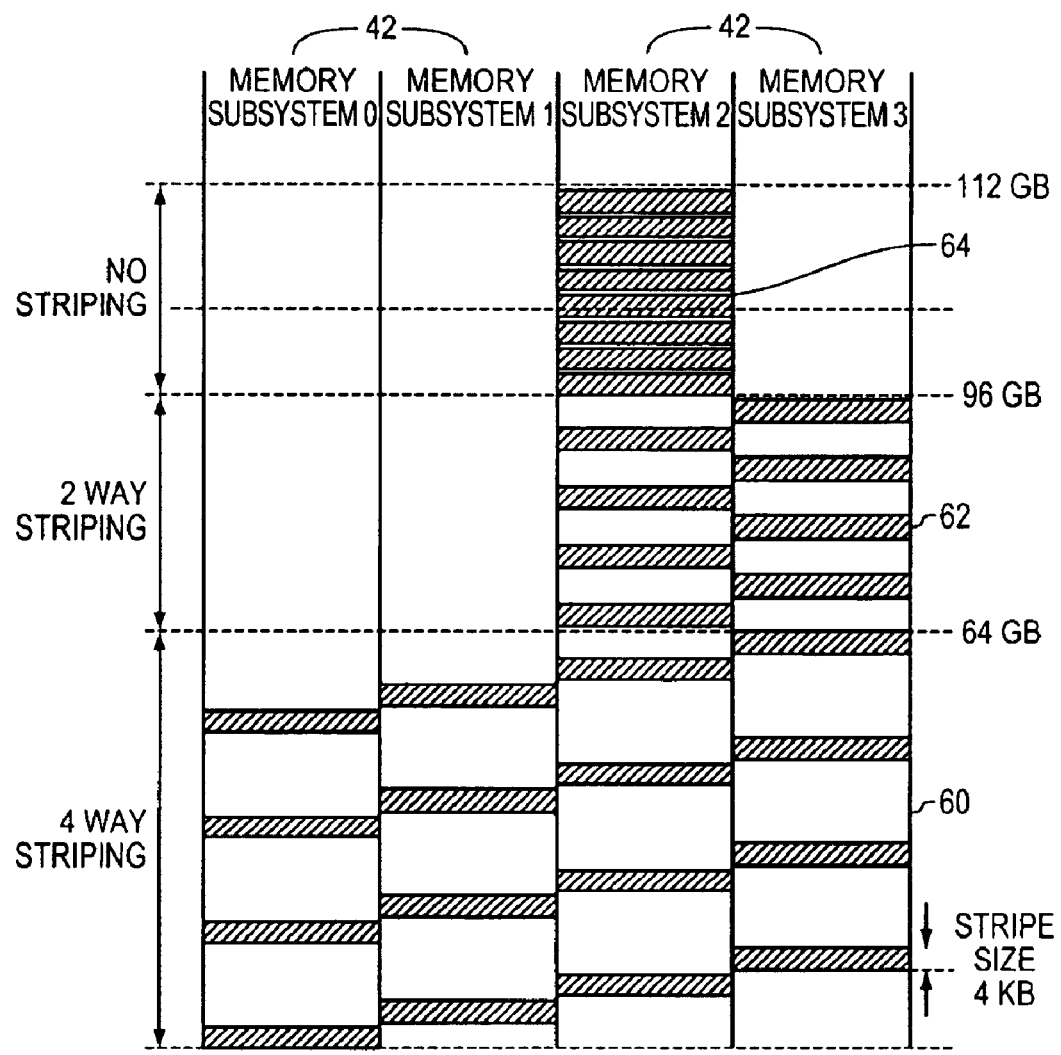
FIG. 8 is a depiction of how memory accesses are striped between memory subsystems by the master controller.

In accordance with a further aspect of the invention, the master controller 26 stripes memory accesses across the memory subsystems 42. Again, the stripe size is preferably larger than the disk block size. An example of memory subsystem striping is shown in FIG. 8. In this example, the stripe size is 4 KB and the memory subsystems 42 are of various sizes. An address decoder in the master controller 26 maps the memory space available in accordance with the following rules from the lowest address:

If all four memory subsystems 42 are available for a given address range, the master controller 26 stripes requests across all four subsystems.

If two or three subsystems 42 are available for a given address range, the master controller 26 stripes across two subsystems 42. The memory on the third subsystem is appended to the memory map after all striping options are exhausted.

If only one subsystem 42 is available for a given address range, no striping is performed.

In the example of FIG. 8, all four memory subsystems 42 are available up to 64 GB, and requests are striped on 4 KB boundaries between all four subsystems 42 (60). So, for example, a 16 KB request below the 64 GB address range would be striped between all four memory subsystems 42 on 4 KB boundaries. Between 64 GB and 96 GB, two subsystems (Memory 2 and Memory 3) are available, and accesses to this address range are striped on 4 KB boundaries across the two subsystems 42 in this range (62). Beyond 96 GB, only the largest memory subsystem (Memory 2) is available, so accesses in this range are not striped (64).

The striping mechanisms as used in accordance with the invention advantageously distribute memory accesses between all memory subsystems 42 and between all memory arrays 44 in an even manner, preventing bus contention to any particular memory subsystem 42 or memory array 44.

As previously described, the master controller 26 communicates with the slave controllers 40 on the four memory subsystems 42 via serial links 50. The SerDes 48 coupled to the master controller 26 translates between the parallel master controller bus 66 (FIG. 6) and the serial link 50, while each SerDes 46 coupled to each slave controller 40 translates between the parallel slave controller busses 68 and the serial links 50 (FIG. 4). The physical layer of each serial link 50 may be conveniently implemented in accordance with the Infiniband physical layer, as described in the Infiniband Architecture Specifications Volumes 1 and 2 Release 1.0.a, published Jun. 19, 2001 by the Infiniband Trade Association, hereby incorporated by reference. The SerDes devices 46 and 48 can then be conveniently implemented with known components such as the Vitesse VCS7226-01, available from Vitesse Corporation, or the TI TLK3104SA, available from Texas Instruments Inc. Physical link initialization and training then take place in accordance with the operation of these devices. The Link layer that operates over the physical serial link is implemented in accordance with the invention.

Figure 9:
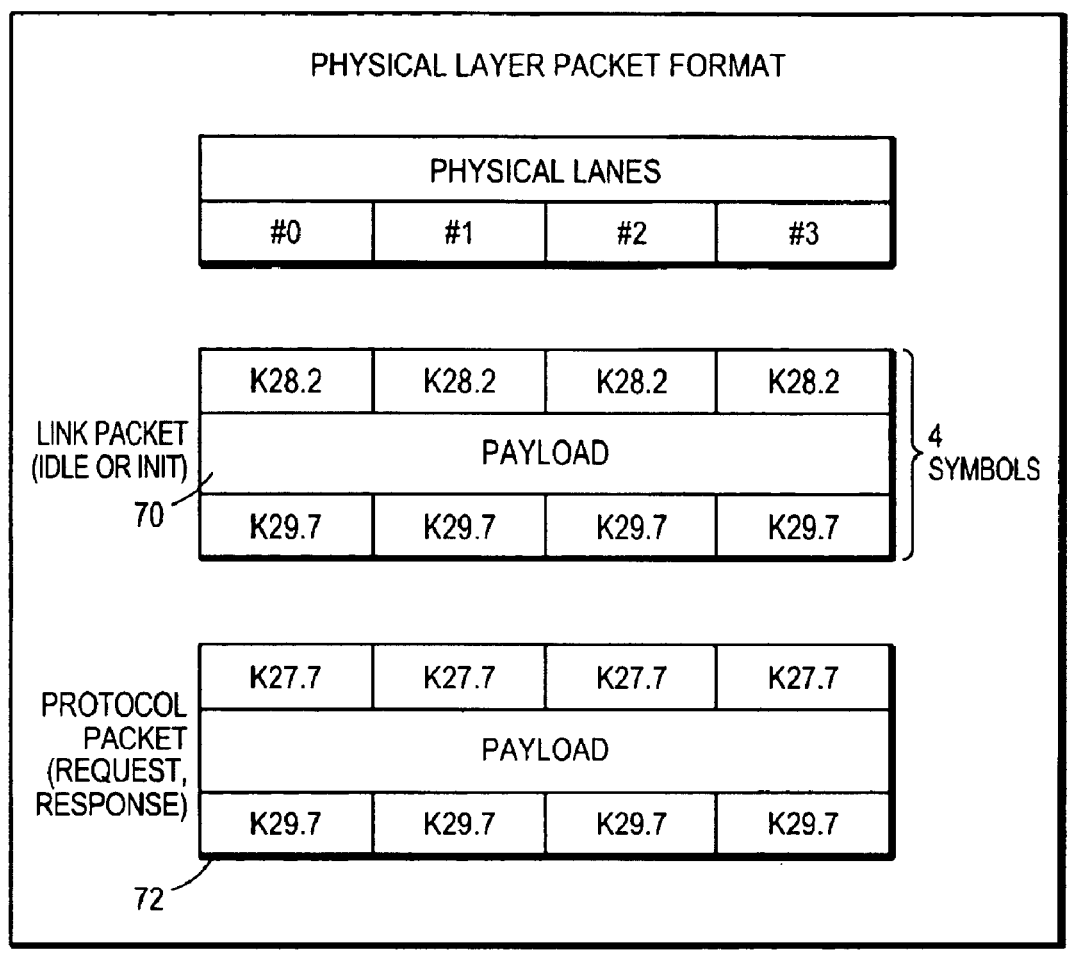
FIG. 9 is a representation of how link packets and protocol packets are encoded over the serial links.

The Link Layer transfers Link Packets 70 and Protocol Packets 72 over the physical serial links. The physical layer packet format for Link Packets and Protocol Packets is shown in FIG. 9. The physical serial links transmit symbols in accordance with industry standard 8 B/10 B endcoding as described in the Infiniband Architecture Specification Volume 2 Release 1.0.a. Once the physical links are initialized and trained, the start of a Link Packet is identified in accordance with standard encoding by a symbol K28.2. The start of a Protocol Packet (or data packet) is identified by a symbol K27.7. The ends of the Link and Protocol Packets are identified by a symbol K29.7.

Generally, Link Packets 70 are used for initialization, for transfer of information about the link, for flow control, and transfer of error information between the master controller 26 and the slave controller 40. Protocol Packets 72 are used to transfer data between the master controller 26 and the database memory 24 via the slave controllers 40 and memory channel controllers 38. A "Protocol Layer" herein refers to the transfer of 110 Protocol Packets 72 back and forth over the Link Layer.

The Link Layer implements two Virtual Channels, designated as channel 0 and channel 1. Channel 0 is used for TAG requests, while channel 1 is used for data requests. Any data request of 128 bytes or larger uses channel 1, while other protocol requests use channel 0. All requests originate from the master controller 26, and all responses originate from the slave controller 40.

Figure 10:
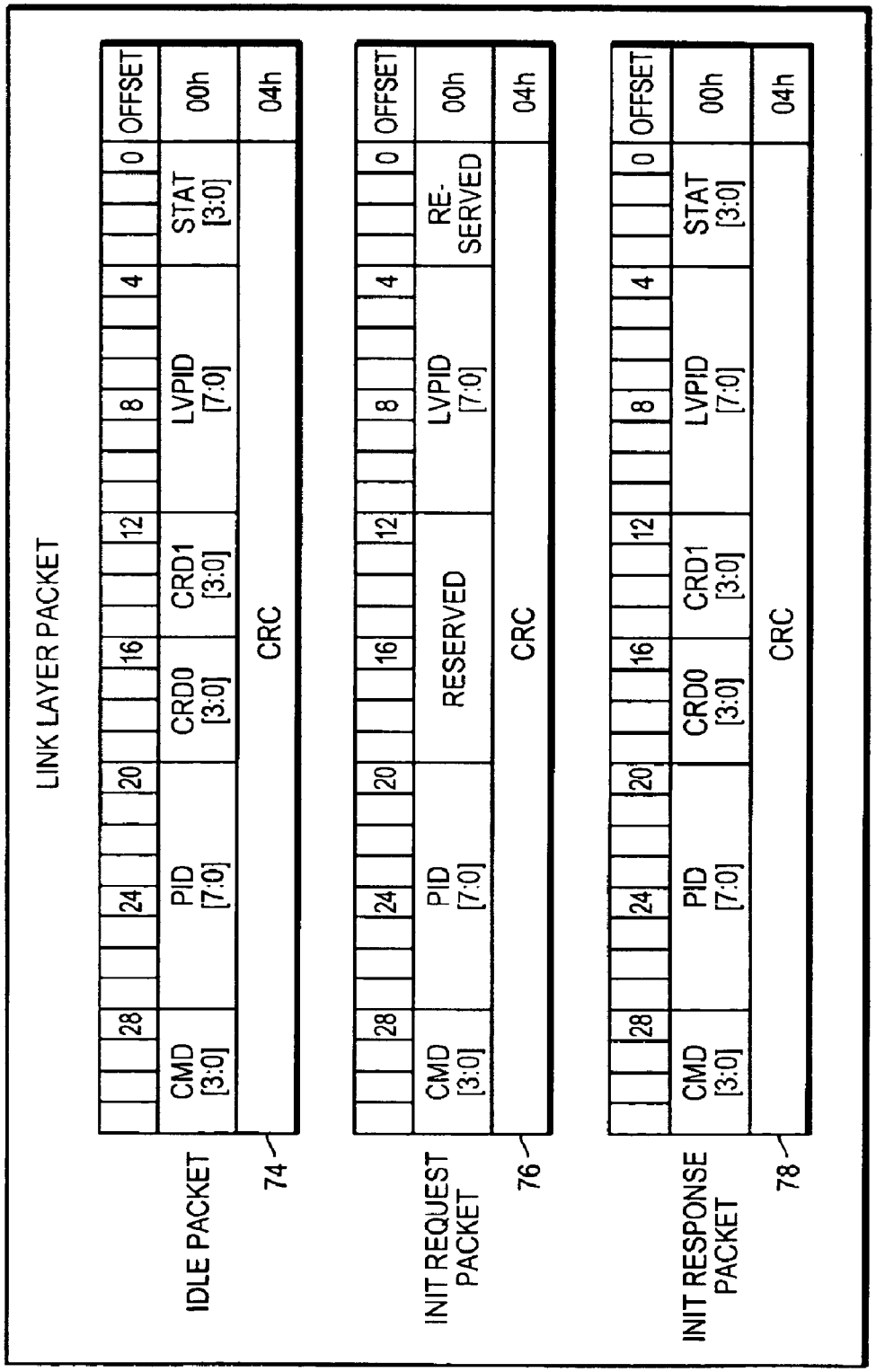
FIG. 10 represents the fields included in the several types of link packets.

As shown in FIG. 10, the Link Layer supports three types of Link Packets 70: Idle Packets 74, Init Request Packets 76, and Init Response Packets 78. Link Packets 70 do not transfer any protocol level information—i.e, they do not result in memory data transfers. The Idle Packet can be issued from both the master controller 26 and the Slave controller 40. Idle Packets are used for initialization, transferring of credits, communicating Last Valid Packet ID (LVPID) values, and communicating link-level error information, all to be further described. The master controller 26 transmits Idle Packets when there are no Protocol Packets to send.

The Init Request Packet 76 is issued once by the master controller 26 each time the physical link is reset and brought up. Upon receipt of an Init Request Packet 76, the slave controller 40 performs reset functions, flushes any outstanding transactions, and then returns an Init Response Packet 78 to the master controller 26.

The size of a Link Packet in accordance with the preferred embodiment is 8 bytes. The table in FIG. 11 describes the Link Packet fields shown in FIG. 10, the functionality of each field to be further described.

Figure 12:
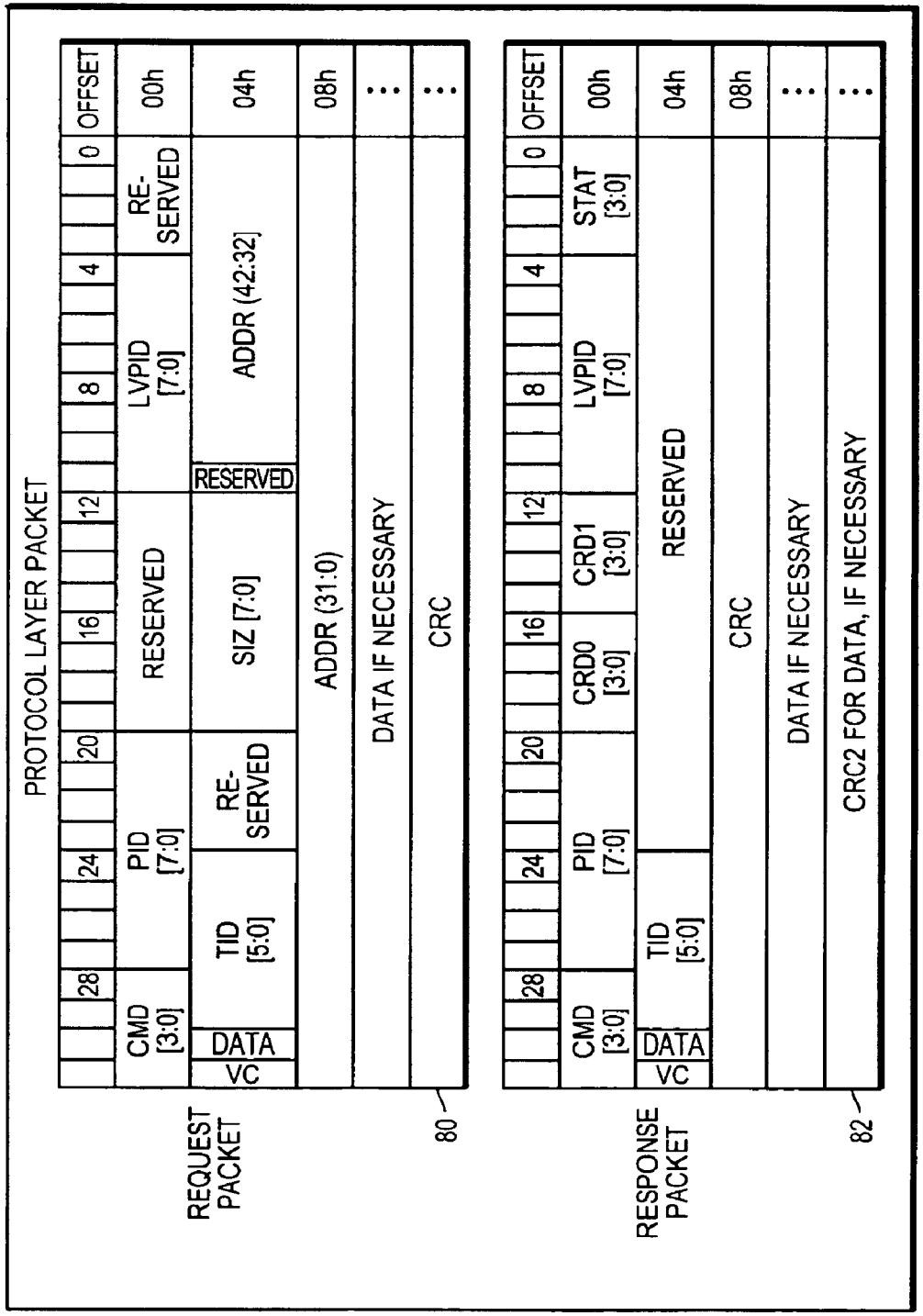
FIG. 12 represents the fields included in the several types of protocol packets.

Two types of Protocol Packets are defined, as shown in FIG. 12: Request Packets 80 and Response Packets 82. Request Packets 80 are sent by the master controller 26 to the slave controller 40 to initiate a memory transaction. Response Packets 82 are sent from the slave controller 40 to the master controller 26 in response to the Request Packets 80, in order to complete the memory transactions initiated by the master controller 26. A Request Packet 80 that is sent by the master controller 26 to initiate a write transaction may contain up to 4 KB of write data. A Response Packet 82 that is sent by the slave controller 40 to the master controller 26 to complete a read transaction may contain up to 4 KB of read data. Though the payload is limited to 4 KB in the current embodiment, it is understood that the payload size can be larger or smaller without departing from the principles of the invention.

The table shown in FIG. 13 describes the functionality of the Protocol Packet fields shown in FIG. 12. The details of these fields will be further described.

As shown in FIGS. 11 and 13, the CMD field is used to distinguish Link Packets from Protocol Packets, and is further used to distinguish the several types of Link and Protocol Packets shown in FIGS. 10 and 12. The CMD field is further used for Protocol Packets to distinguish request from Response Packets, and to further distinguish several different types of Request Packets. The CMD field in the Protocol Packets distinguishes memory read requests, memory write requests, and CSR read and write requests. CSR read and write requests are used to read or write status registers in the slave controller 40.

Flow control is performed over each serial link 50 at the Link Layer, and is credit-based. The credit information is maintained at the master controller 26 for each virtual channel. After initialization, before starting any operation, the master controller 26 issues an Init Request Packet 76 to the slave controller 40. The slave controller 40 returns an Init Response Packet 78 containing the initially available credits for both channels in the fields CRD0 and CRD1.

Whenever the master controller 26 sends a Protocol Packet, the credit for the corresponding channel is decremented. The master controller 26 cannot send a packet through the channel with zero credit. When the slave controller 40 frees up link-level resources, the credit is returned in a Response Packet 82 or Idle Packet 74. The credits apply to Protocol Packets only, because Link Packets such as Idle Packets do not consume link level buffers, so Link Packets may be sent without credit. Link Errors, as reported in the STAT field for Link Packets (FIG. 10), are detected at the Link Layer and the Physical Layer. The following link errors are detected and reported.

CRC Error: This error is reported when the receiver detects a CRC error. When a CRC error is detected, the information in the packet is corrupt and unusable.

Elastic Buffer Error (Overrun/Underrun Error): This error is reported when the receiver cannot perform rate matching, resulting in buffer under-run or over-run. This error can be corrected by inserting more IDLE symbols. (IDLE symbols are distinct from the Idle Packet, and are symbols transmitted at the physical layer for performing rate matching.)

Invalid Character Error: This error is reported when the receiver detects an invalid character. The invalid character is dropped.

Disparity Error: This error is reported when a valid character is received with invalid disparity. The character is dropped.

Loss of Synchronization: The Receiver state machine is in Loss of Synchronization state. Resychronization must be performed.

The link level errors are transparent to the Protocol Layer. If link level errors impact Protocol Packets, the packet transmission is retried after the link is once again operational. A Link Level Retry mechanism is provided at the Link Layer so that a Protocol Layer operation can automatically recover from a link error.

As shown in FIGS. 10 and 12 (see PID field), all packets are identified by an 8 bit Packet Identifier (PID). The PID is a sequential number valid in each direction. Each transmitter in the master controller 26 and the slave controller 40 maintains an 8-bit counter that counts the packets sent. Each packet sent is tagged with the PID value.

Unlike credits, the PID) is assigned to both Link and Protocol Packets, because Link Packets are used to transfer credit information from the slave controller 40 to the master controller 26. If these Link Packets should be lost, credit counts would become inconsistent between the master controller 26 and the slave controller 40. The PD is thus assigned to Link Packets to allow lost packet recovery as further described.

During normal operation, the transmitter sends the packet with PID and the remote node returns the Last Valid PID (LVPID field, FIGS. 10 and 12) with either Idle or Protocol Packets. The LVPID is the PID of the last valid Protocol Packet received at the remote node. For instance, the master controller 26 sends packets with PIDs to the remote slave controller 40, while the LVPID returned by the remote slave controller 40 to the master controller 26 reflects the PID of the last valid Protocol Packet received by the slave controller 40. Both the master controller 26 and the slave controller 40 send PD and receive LVPID from each other. The LVPID maintained at the slave controller 40 is called the Request LVPID, while the one maintained at the master controller 26 is called the Response LVPID.

When the link goes down, Protocol Packets in transition may be lost. When the link recovers, each transmitter re-sends any packets following the LVPID number returned. The slave controller 40 transmitter re-sends responses with their original PID.

The master controller 26 re-sends requests with their original PID.

This mechanism requires that the master controller 26 and the slave controller 40 keep packets already sent until its own LVPID or that of a later packet is received. To maintain fluid operation of the link, the transmitter needs to keep a certain number of packets. The number of packets to keep depends on how quickly the LVPID can be returned. If the transmitter cannot keep more packets, it does not transmit a new one until a new LVPID is returned, freeing up the packet entry.

In certain cases, the master controller 26 or the slave controller 40 may issue duplicate packets. For example, when the master controller 26 detects a link level error, the error status and Response LVPID is retuned in an Idle Packet 74 as previously described. The master controller 26 then proceeds to reset the link. The slave controller 40 receives the Response LVPID and starts its link reset sequence as well. After the link becomes operational again, both transmitters re-send any packets following the LVPID numbers previously returned. In this case, the Response LVPID that was returned to the slave controller 40 is current. However, the Request LVPID at the master controller 26 may not be current and may be too low due to the time lag involved in returning the Request LVPID from the slave controller 40 to the master controller 26. Thus, the master controller 26 may end up issuing duplicate Request Packets to the slave controller 40.

Similarly, when the slave controller 40 detects a link level error, it returns the error status and Request LVPID in an Idle Packet 74. The slave controller 40 then starts the link reset sequence. The master controller 26 receiver accepts the Request LVPID and starts its link reset sequence as well. After the link becomes operational again, the transmitters re-send any packets following the LVPID numbers previously returned. In this case, the Request LVPID returned to the master is current, but the Response LVPID may be too low. Therefore, the slave controller 40 may issue duplicate Response Packets to the master controller 26.

Both the master controller 26 and the slave controller 40 drop duplicate packets. This is accomplished by monitoring for duplicate PIDs. When a packet with a PID equal to or smaller than the locally stored LVPID is received, it is dropped.

The PID field is used for packet sequence tracking only. The Transaction ID field, TID, is provided in the Protocol Packets 80 and 82 in order to match Response Packets to Request Packets.

Two CRC fields, CRC and CRC2 are provided in the Response Packet 82 to support non-store-forward operation. The CRC field covers the command portion of the packet, and the CRC2 field covers the data portion of the packet. The master controller 26 can start forwarding data after the CRC covering the command portion of the packet is successfully checked. If an error is detected for data with CRC2, the master controller 26 signals an error, such as a parity error, at the target bus, aborting the transaction Protocol Errors are encoded in the STAT field, and are defined as follows:

Master Abort: This error is reported when the master controller has sent a Request Packet containing an address or target that does not exist. The request completes normally. If the request requires data, undefined data are returned with the response.

Correctable Error: This error is reported when a correctable ECC error is detected and corrected in the memory subsystem. The request completes normally.

Un-correctable Error: This error is reported when an uncorrectable ECC or parity error is detected in the memory subsystem. No data are returned to the requester.

No Credit Available: The slave received a request with no credit available. No data are returned to the requester.

Figure 14:
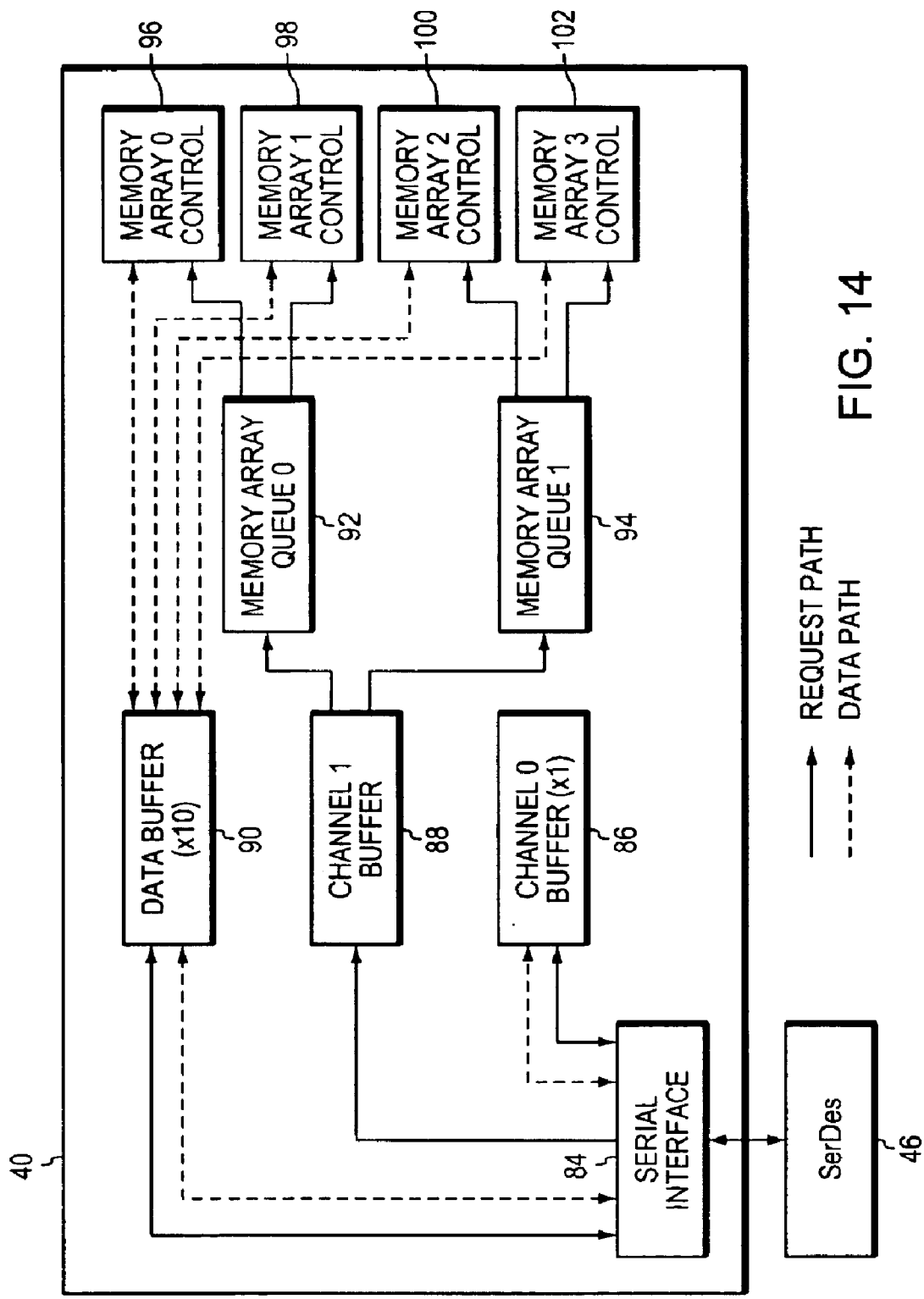
FIG. 14 is a schematic representation of the slave controller FIGS. 4 and 5.

Referring now to FIG. 14, there is shown the slave controller 40 in further detail. The slave controller 40 includes a serial interface 84 for interfacing to the SerDes 46. The serial interface 84 is in communication with two link-level buffers, one channel request buffer 86 and 1 channel 1 request buffer 88. Virtual channel 0 requests are queued in the channel 0 buffer 86. Virtual channel 1 requests are queued in the channel 1 buffer 88. Also provided is a channel 1 data buffer 90 for buffering the data associated with virtual channel 1 requests. Two memory array queues, memory array queue 0 (92) and memory array queue 1 (94) are coupled to the channel 1 request buffer. The memory array queue 0 is coupled to memory array 0 control interface 96 and to a memory array 1 control interface 98. The memory array queue 1 is coupled to a memory array 2 control interface 100, and to a memory array 3 control interface 102. All memory array control interfaces are then coupled to the memory channel controllers as shown in FIGS. 3 and 4.

Virtual channel 1 requests received from the SerDes 46 by the serial interface 84 are queued to the channel 1 request buffer 88, and the data payloads associated with the requests are reserved in the channel 1 data buffer 90. The memory array queue 0 (92) is responsible for interleaving the requests between memory arrays 0 and 1 by forwarding the requests to the appropriate memory array 0 control interface 96 or memory array control interface 98 as was previously described. Likewise, the memory array queue 1 (94) is responsible for interleaving the requests between memory arrays 2 and 3 by forwarding the requests to the appropriate memory array 2 control interface 96 or memory array 3 control interface 98. The slave controller 40 stripes the requests queued in the channel 1 request buffer 88 between the memory array queues 0 and 1 (92 and 94) as previously described, in accordance with a predetermined address block stripe boundary. The memory array control interfaces 0–3 keep track of transactions outstanding. If a request is a memory read, the read data will be returned to the corresponding reserved data buffer in the data buffer 90. The data buffer 90 returns data and status back to the serial interface 84, which forms the appropriate link and protocol packet responses. If a request is a write, then the memory array control interfaces receive the write data from the data buffer 90, complete the write, and return status to the data buffer 90, which then returns status back to the serial interface 84. The serial interface 84 then generates the appropriate link and protocol packet responses.

As previously described, flow control is credit based. In the example herein shown, the channel 0 request buffer 86 can hold one request and so the initial CRD0 value is set to one. The channel 1 request buffer 88 and the data buffer 90 can hold 10 requests and corresponding payloads, so the initial CRD1 value is 10. As previously described, the master controller 26 decrements its credit value every time it sends a request. The slave controller 40 returns its current credit values with idle packets or response packets corresponding to the request packets from the master controller 26.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any system that includes a very large memory system, such as a large computing system or network system. The control functions have been described generally herein, yet the skilled artisan will realize that the functionality of the described controllers may in fact be partitioned amongst several different controllers. The implementations herein described employ a cache system within a storage system, but it will be clear to the skilled artisan that the cache system and disk array need not reside within the same system. The implementation described herein employs 512 Mb double stacked DDR DRAM memory devices; however, it will be clear to one skilled in the art that other sizes and types of memory devices may be employed without departing from the principles of the invention. In particular, it will be clear that the various aspects of the invention will scale up to support larger capacity memory devices as they become available. The described control functions may be employed in hardware or in software, or in a combination of the two. All such modifications are intended to fall within the scope of the following appended claims. Accordingly, the claims set forth below should be construed in view of the full breadth and spirit of the present invention as disclosed herein.

We claim:

1. A memory system comprising:
   a plurality of memory subsystems, each subsystem including a slave controller, each slave controller coupled to a serial link;
   wherein a memory subsystem comprises a plurality of memory arrays; wherein a memory array comprises a plurality of memory channels, each memory channel comprising memory coupled to a memory channel controller; and
   a master controller coupled to the slave controllers via the serial links, the master controller being capable of initiating a memory access to a memory subsystem by communicating with the slave controller via the serial link coupled to the slave controller;
   wherein memory accesses to a memory array on a memory subsystem are interleaved by the slave controller between the memory channels, and wherein blocks of memory accesses to a memory subsystem are striped by the slave controller between the memory arrays on the memory subsystem.

2. The memory channel of claim 1 wherein blocks of memory accesses are striped between memory subsystems by the master controller.

3. A memory system comprising:
   a plurality of memory subsystems, each subsystem including a slave controller, each slave controller coupled to a serial link; and
   a master controller coupled to the slave controllers via the serial links, the master controller being capable of initiating a memory access to a memory subsystem by communicating with the slave controller via the serial link coupled to the slave controller;
   wherein the master controller and slave controllers communicate by sending link packets and protocol packets over the serial links; and
   wherein the link packets and protocol packets include a packet identifier field, and wherein each time the master controller sends a link or protocol packet, the master controller sequentially increments the packet identifier field in the packet, and wherein each time the slave controller sends a link or protocol packet, the slave controller sequentially increments the packet identifier field in the packet.

4. The memory system of claim 3 wherein the link packets and protocol packets include a last valid packet identifier, and wherein the last valid packet identifier in a link packet or protocol packet sent by a slave controller to the master controller identifies the last packet identifier received by the slave controller from the master controller, and wherein the last valid packet identifier in a link packet or protocol packet sent by the master controller to a slave controller identifies the last packet identifier received by the master controller from the slave controller.

5. A memory system comprising:
   a plurality of memory subsystems, each subsystem including a slave controller, each slave controller coupled to a serial link; and
   a master controller coupled to the slave controllers via the serial links, the master controller being capable of initiating a memory access to a memory subsystem by communicating with the slave controller via the serial link coupled to the slave controller;
   wherein the master controller and slave controllers communicate by sending link packets and protocol packets over the serial links; and
   wherein the link packets and protocol packets include a credit field, and wherein the credit field contains a credit value sent from a slave controller to the master controller, and wherein the credit value indicates to the master controller whether packets may be sent from the master controller to the slave controller.

6. A memory system comprising:
   a plurality of memory subsystems, each subsystem including a slave controller, each slave controller coupled to a serial link; and
   a master controller coupled to the slave controllers via the serial links, the master controller being capable of initiating a memory access to a memory subsystem by communicating with the slave controller via the serial link coupled to the slave controller;
   wherein the master controller and slave controllers communicate by sending link packets and protocol packets over the serial links;
   wherein the protocol packets comprise request packets which are sent by the master controller to the slave controllers in order to initiate a memory transfer;
   wherein the protocol packets comprise response packets which are sent by the slave controllers to the master controller in order to execute a memory transfer; and
   wherein the protocol packets include a transaction identifier field, and wherein the master controller uses the transaction identifier field to align response packets with request packets.

7. A method of operating a memory system comprising:
   providing a plurality of memory subsystems, each subsystem including a slave controller each slave controller coupled to a serial link;
   wherein the step of providing a plurality of memory subsystems includes the step of providing, for each subsystem, a plurality of memory arrays coupled to the slave controller;
   wherein the step of providing, for each subsystem, a plurality of memory arrays includes the step of providing, for each memory array, plurality of memory channels, each memory channel comprising memory coupled to a memory channel controller;
providing a master controller coupled to the slave controllers via the serial links;
initiating by the master controller a memory access to a memory subsystem by communicating with the slave controller via the serial link coupled to the slave controller;
interleaving by the slave controller memory accesses initiated by the master controller between the memory channels; and
striping by the slave controller blocks of memory accesses initiated by the master controller between the memory arrays on the memory subsystem.

8. The method of claim 7 further comprising the step of:
striping blocks of memory accesses between memory boards by the master controller.

9. A method of operating a memory system comprising:
providing a plurality of memory subsystems, each subsystem including a slave controller, each slave controller coupled to a serial link;
providing a master controller coupled to the slave controllers via the serial links; and
initiating by the master controller a memory access to a memory subsystem by communicating with the slave controller via the serial link coupled to the slave controller;
wherein the step of initiating by the master controller a memory access to a memory subsystem by communicating with the slave controller via the serial link coupled to the slave controller comprises the step of sending link packets and protocol packets over the serial links by the master controller and slave controller;
wherein the step of sending link packets and protocol packets includes the step of sending link packets and protocol packets that include a packet identifier field, and wherein the method further comprises the steps of:
each time the master controller sends a link or protocol packet, sequentially incrementing by the master controller the packet identifier field in the packet; and
each time the slave controller sends a link or protocol packet, sequentially incrementing by the slave controller the packet identifier field in the packet.

10. The method of claim 9 wherein the step of sending link packets and protocol packets includes sending link packets and protocol packets that include a last valid packet identifier, and wherein the method further includes the steps of:
using by the master controller the last valid packet identifier in a link packet or protocol packet sent by a slave controller to the master controller to identify the last packet identifier received by the slave controller from the master controller; and
using by a slave controller the last valid packet identifier in a link packet or protocol packet sent by the master controller to the slave controller to identify the last packet identifier received by the master controller from the slave controller.

11. A method of operating a memory system comprising:
providing a plurality of memory subsystems, each subsystem including a slave controller, each slave controller coupled to a serial link;
providing a master controller coupled to the slave controllers via the serial links; and initiating by the master controller a memory access to a memory subsystem by communicating with the slave controller via the serial link coupled to the slave controller;
wherein the step of initiating by the master controller a memory access to a memory subsystem by communicating with the slave controller via the serial link coupled to the slave controller comprises the step of sending link packets and protocol packets over the serial links by the master controller and slave controller; and
wherein the step of sending link packets and protocol packets comprises the step of sending link packets and protocol packets including a credit field, and wherein the credit field contains a credit value sent from a slave controller to the master controller, and wherein the credit value indicates to the master controller whether packets may be sent from the master controller to the slave controller.

12. A method of operating a memory system comprising:
providing a plurality of memory subsystems, each subsystem including a slave controller each slave controller coupled to a serial link; providing a master controller coupled to the slave controllers via the serial links; and initiating by the master controller a memory access to a memory subsystem by communicating with the slave controller via the serial link coupled to the slave controller;
wherein the step of initiating by the master controller a memory access to a memory subsystem by communicating with the slave controller via the serial link coupled to the slave controller comprises the step of sending link packets and protocol packets over the serial links by the master controller and slave controller;
wherein the step of sending protocol packets comprises the step of sending request packets from the master controller to the slave controllers in order to initiate a memory transfer;
wherein the step of sending protocol packets further comprises the step of sending response packets from the slave controllers to the master controller in order to execute a memory transfer; and
wherein the step of sending protocol packets includes the step of sending protocol packets including a transaction identifier field, and wherein the master controller uses the transaction identifier field to align response packets with request packets.

13. A program product comprising a computer readable medium having embodied therein a computer program for storing data, the computer program comprising:
a plurality of instances of slave controller logic, each instance of slave controller logic for controlling a memory subsystems, each instance of slave controller logic coupled to a serial link; and
master controller logic coupled to the instances of slave controller logic via the serial links, the master controller logic being capable of initiating a memory access to a memory subsystem by communicating with the slave controller logic via the serial link coupled to the slave controller logic;
wherein each instance of slave controller logic is coupled to a plurality of memory arrays within the memory subsystem;
wherein a memory array comprises a plurality of memory channels, each memory channel comprising memory coupled to a memory channel controller; and wherein memory accesses to a memory array on a memory board are interleaved by the slave controller logic between the memory channels, and wherein memory accesses to a memory subsystem are striped by the slave controller logic between the memory arrays on the memory subsystem.

14. The program product of claim 13 wherein memory accesses are striped between memory boards by the master controller logic.

15. A program product comprising a computer readable medium having embodied therein a computer program for storing data, the computer program comprising:

a plurality of instances of slave controller logic, each instance of slave controller logic for controlling a memory subsystems, each instance of slave controller logic coupled to a serial link; and master controller logic coupled to the instance of slave controller logic via the serial links, the master controller logic being capable of initiating a memory access to a memory subsystem by communicating with the slave controller logic via the serial link counted to the slave controller logic;

wherein the master controller logic and instances of slave controller logic communicate by sending link packets and protocol packets over the serial links; and wherein the link packets and protocol packets include a packet identifier field, and wherein each time the master controller logic sends a link or protocol packet, the master controller logic sequentially increments the packet identifier field in the packet, and wherein each time an instance of slave controller logic sends a link or protocol packet, the slave controller logic sequentially increments the packet identifier field in the packet.

16. The program product of claim 15 wherein the link packets and protocol packets include a last valid packet identifier, and wherein the last valid packet identifier in a link packet or protocol packet sent by an instance of slave controller logic to the master controller logic identifies the last packet identifier received by the slave controller logic from the master controller logic, and wherein the last valid packet identifier in a link packet or protocol packet sent by the master controller logic to an instance of slave controller logic identifies the last packet identifier received by the master controller logic from the slave controller logic.

17. A program product comprising a computer readable medium having embodied therein a computer program for storing data, the computer program comprising:

a plurality of instances of slave controller logic, each instance of slave controller logic for controlling a memory subsystems, each instance of slave controller logic coupled to a serial link; and master controller logic coupled to the instances of slave controller logic via the serial links, the master controller logic being capable of initiating a memory access to a memory subsystem by communicating with the slave controller logic via the serial link coupled to the slave controller logic;

wherein the master controller logic and instances of slave controller logic communicate by sending link packets and protocol packets over the serial links; and wherein the link packets and protocol packets include a credit field, and wherein the credit field contains a credit value sent from an instance of slave controller logic to the master controller logic, and wherein the credit value indicates to the master controller logic whether packets may be sent from the master controller logic to the slave controller logic.

18. A program product comprising a computer readable medium having embodied therein a computer program for storing data, the computer program comprising:

a plurality of instances of slave controller logic, each instance of slave controller logic for controlling a memory subsystems, each instance of slave controller logic coupled to a serial link; and master controller logic coupled to the instances of slave controller ionic via the serial links, the master controller logic being capable of initiating memory access to a memory subsystem by communicating with the slave controller logic via the serial link coupled to the slave controller logic;

wherein the master controller logic and instances of slave controller logic communicate by sending link packets and protocol packets over the serial links;

wherein the protocol packets comprise request packets which are sent by the master controller logic to an instance of slave controller logic in order to initiate a memory transfer;

wherein the protocol packets comprise response packets which are sent by an instance of slave controllers logic to the master controller logic in order to execute a memory transfer;

wherein the protocol packets include a transaction identifier field, and wherein the master controller logic uses the transaction identifier field to align response packets with request packets.

* * * * *